Figures 1, 7:
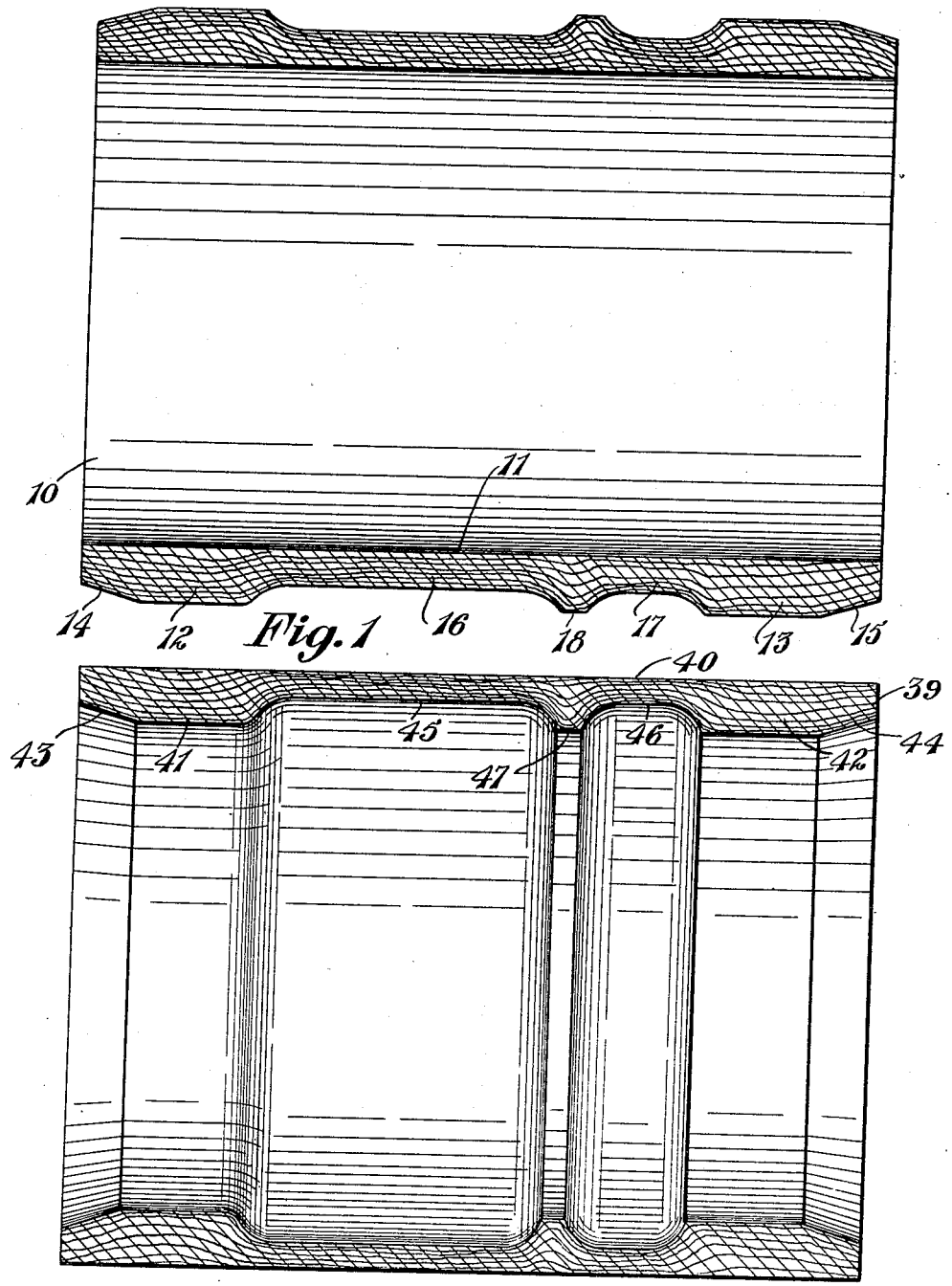

June 19, 1951 — C. A. BRAUCHLER — 2,557,722
METHOD OF FORGING HOLLOW ARTICLES
Filed Feb. 1, 1946 — 6 Sheets-Sheet 1

INVENTOR.
Charles A. Brauchler
BY
Firease and Bishop
ATTORNEYS

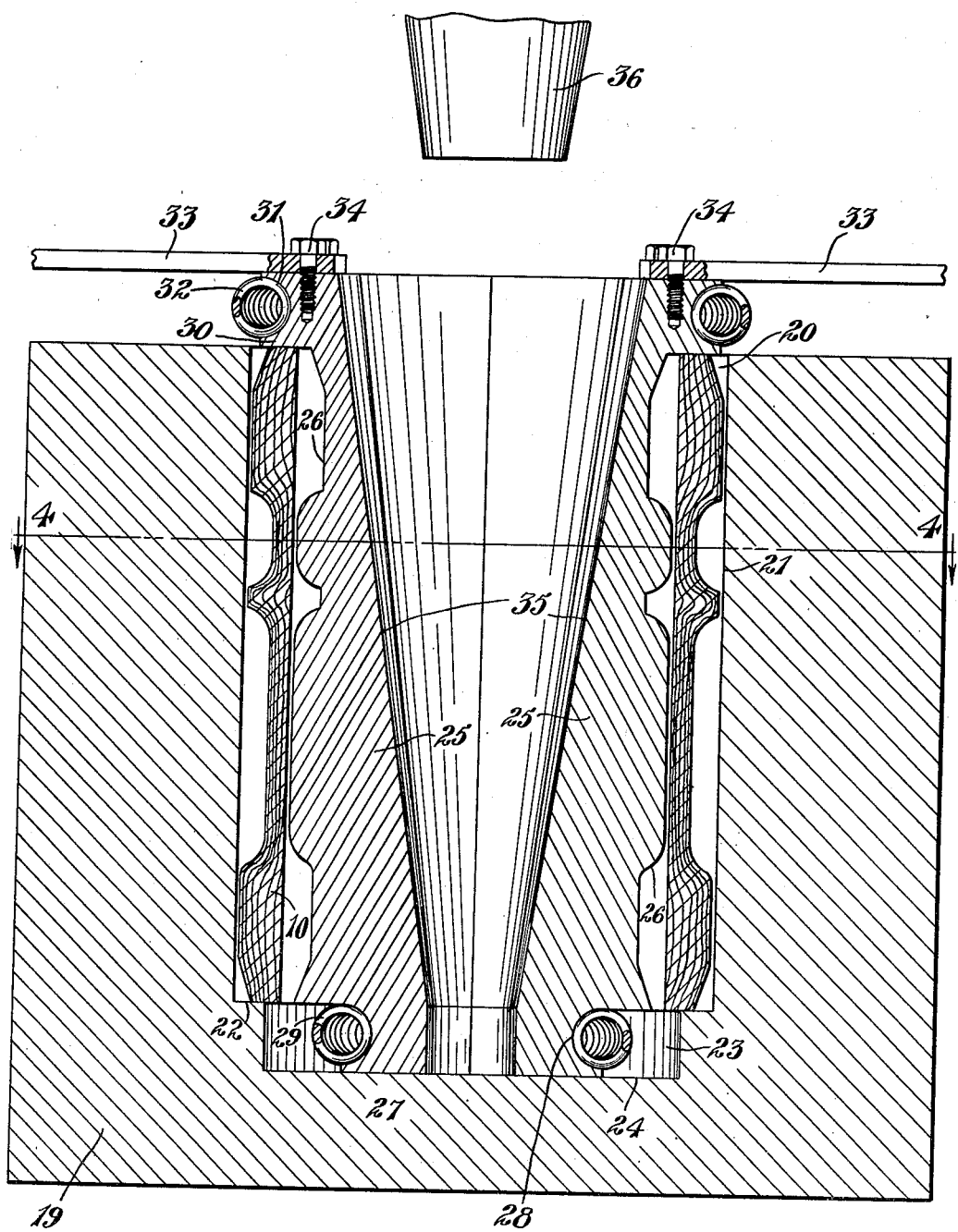

June 19, 1951  C. A. BRAUCHLER  2,557,722
METHOD OF FORGING HOLLOW ARTICLES
Filed Feb. 1, 1946  6 Sheets-Sheet 5

INVENTOR.
Charles A. Brauchler
BY
Freese and Bishop
ATTORNEYS

June 19, 1951   C. A. BRAUCHLER   2,557,722
METHOD OF FORGING HOLLOW ARTICLES
Filed Feb. 1, 1946   6 Sheets-Sheet 6

INVENTOR.
Charles A. Brauchler
BY
Frease and Bishop
ATTORNEYS

Patented June 19, 1951

2,557,722

UNITED STATES PATENT OFFICE 2,557,722

METHOD OF FORGING HOLLOW ARTICLES

Charles A. Brauchler, Canton, Ohio

Application February 1, 1946, Serial No. 644,944

7 Claims. (Cl. 78—81)

The invention relates to the formation of hollow articles with irregular interior surfaces, and more particularly to a novel method of producing such articles by forging.

Under present practice piston skirts, and similar hollow articles having irregular inner surfaces, are ordinarily formed by first producing a straight sided, tubular blank having an outside diameter substantially that required in the finished article and then machining the inside to the desired irregular contour.

This inside machining of the article is a difficult and expensive operation and can not be done accurately. Furthermore the machining of the interior of the article to the desired contour cuts through the grain flow of the metal and materially weakens the finished article.

It is not practical to produce the desired irregular contour on the interior of such articles by usual forging methods, as a forging die could not be removed from the interior of the article after such a contour is produced therein.

The object of the present invention is the production of hollow articles having an irregular inner contour by a method which overcomes the difficulties and objections encountered in present practice.

Another object is the provision of a method for producing such articles in which all of the grains of the metal in the side walls of the article are under compression and in which a substantially straight or longitudinal grain flow is produced, the grain following the inner contour of the article so that the fibres of the grain are not cut by machining to complete the article.

A further object is to provide a novel method for forging such articles by first producing a forged tubular blank having a substantially straight or regular inner contour and an irregular outer contour, substantially conforming to the desired inner contour in the finished article, and then deforming the article by internal forging pressure to displace certain portions of the metal outwardly so as to produce the finished tubular article having a substantially straight outer contour and the desired irregular inner contour.

A still further object is the provision of such a method which includes the formation of the partially completed tubular forging with straight inner walls and irregular outer contour and then placing the same, at forging temperature, within a hollow die and deforming or displacing portions of the metal outwardly into the die by means of an expansible mandrel so as to transfer the irregular contour from the exterior to the interior of the article.

Still another object of the invention is to provide a method for forging such articles which consists in first heating a bar blank to forging temperature and in an upsetting operation piercing the blank and forming a hollow tubular article with straight inner walls and irregular outer walls, and then, at forging temperature, transferring the irregular outer contour to the interior of the tubular article by press forging.

Another object is to provide such a method in which the partially completed tubular product is first forged to slightly greater thickness than desired in the finished article, the outer contour being then slightly machined to the desired thickness after which the partially completed product is reheated to forging temperature and deformed so that the irregular outer contour is transferred to the interior of the article.

A still further object is to provide a method as above described in which after the first pressing operation of the expansible mandrel the mandrel is contracted and given a partial turn and again expanded to produce the completed article.

Figure 3:
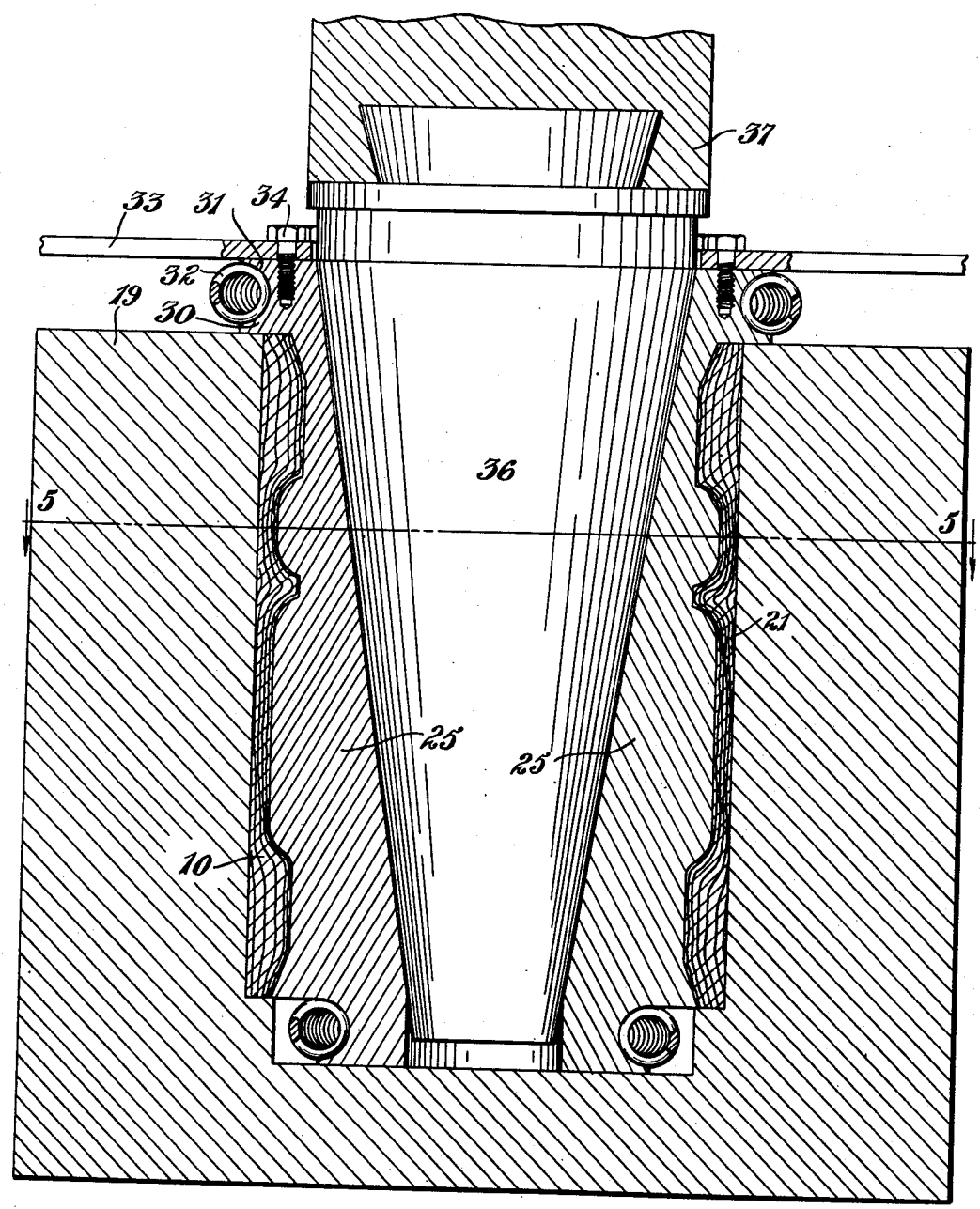
Figure 4:
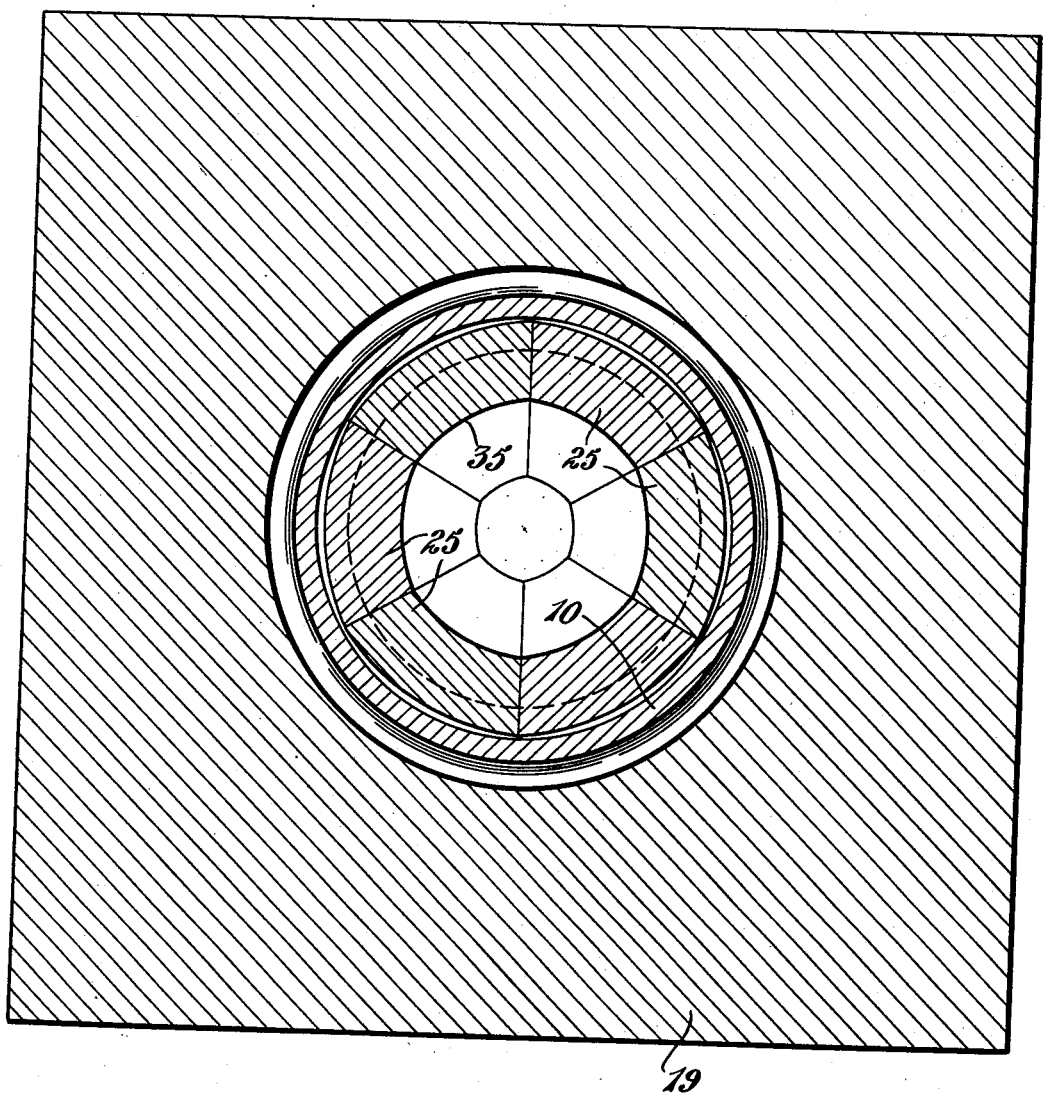
Figure 5:
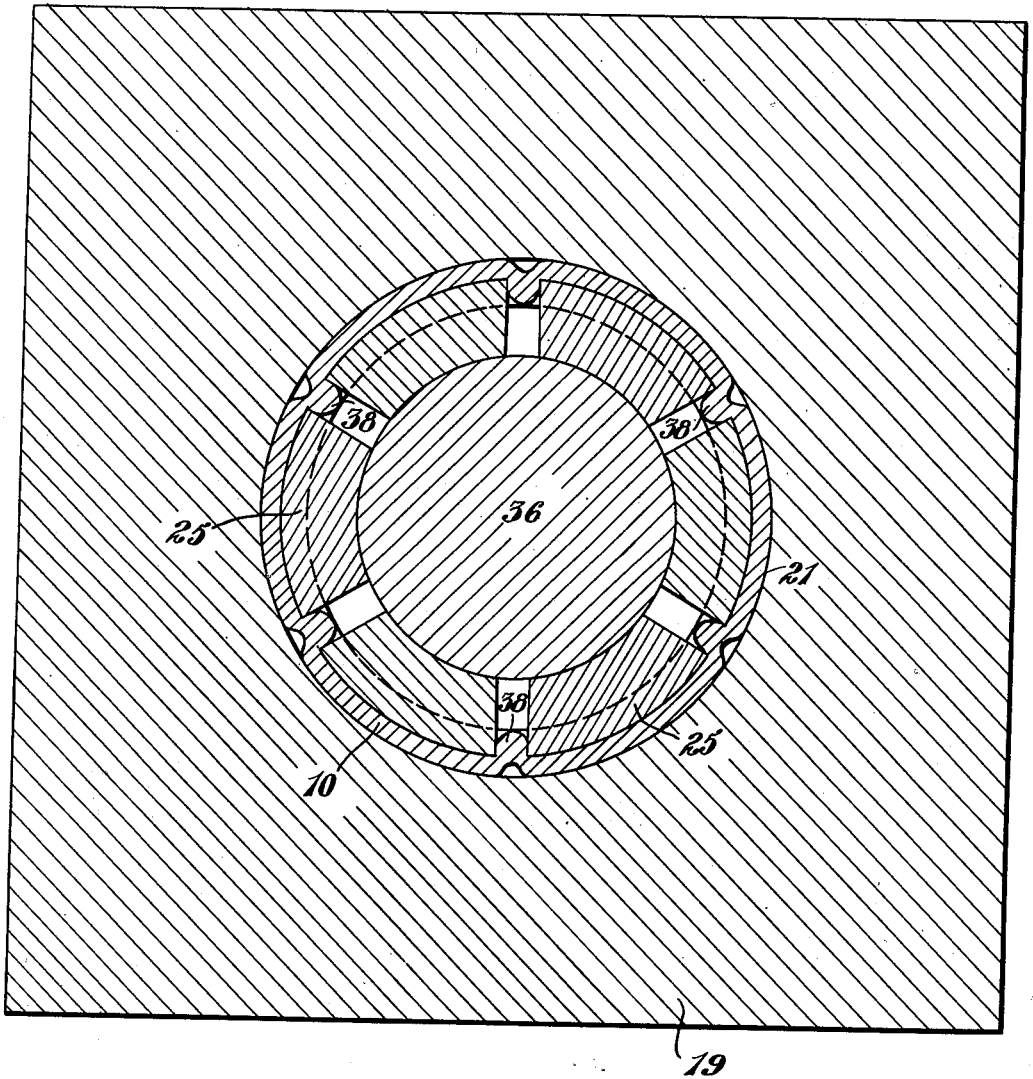
Figure 6:
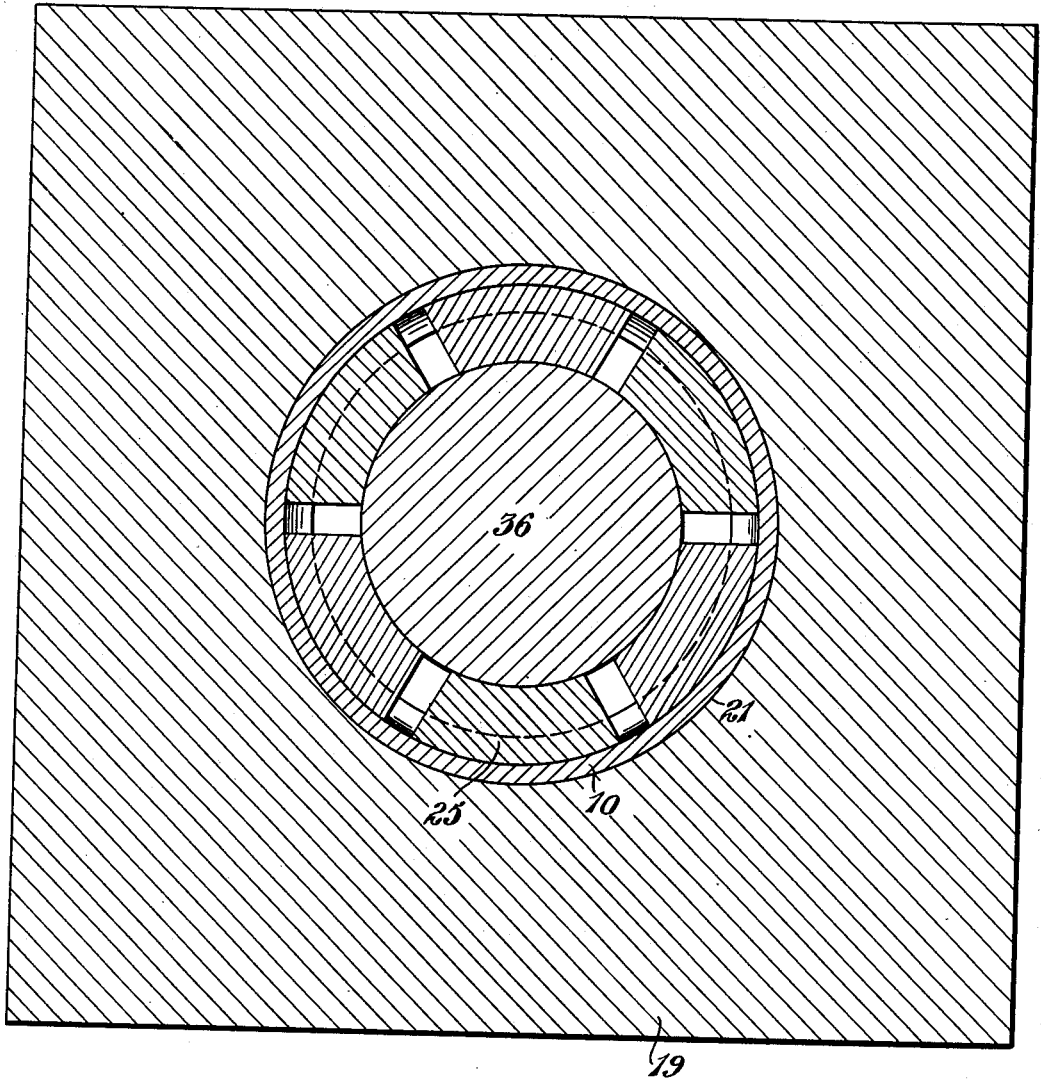

The above objects, together with others which will be apparent from the drawings and following description, or which may be later referred to, may be attained by carrying out the improved forging method in the manner hereinafter described in detail and illustrated in the accompanying drawings, in which:

Figure 1 is a longitudinal sectional view through the partially completed tubular product with straight inner walls and irregular exterior contour;

Fig. 2 a vertical, longitudinal, sectional view through the press forging die and expansible mandrel, showing the partially completed tubular product in position within the die before the mandrel has been expanded;

Fig. 3 a similar view showing the mandrel in expanded position to transfer the irregular contour from the exterior to the interior of the tubular article;

Fig. 4 a transverse, sectional view taken on the line 4—4, Fig. 2;

Fig. 5 a transverse, sectional view taken on the line 5—5, Fig. 3;

Fig. 6 a view similar to Fig. 5 showing the expansible mandrel in expanded position after it has been given a partial turn within the die, and;

Fig. 7 a longitudinal sectional view through the finished forging produced by the novel process hereinafter described.

Although the forging to which the invention pertains is applicable to the formation of many different tubular articles having irregular inner contours, for the purpose of illustration the invention is disclosed herein as applied to the formation of a piston skirt for a fabricated floating piston, for use in a Diesel engine or the like.

In carrying out the improved method a bar blank of suitable size is heated to forging temperature and as by an upsetting operation is pierced and formed to the shape shown in Fig. 1, producing a partially completed tubular product indicated generally at 10, having the straight inner walls 11 and the irregular outer contour which may comprise the relatively high portions 12 and 13 at opposite ends, terminating in the beveled portions 14 and 15 respectively, and the intermediate relatively low portions 16 and 17 separated by the high point 18, this being the contour which is ultimately desired upon the interior of the finished article.

The partially completed product shown in Fig. 1 may be forged to substantially the wall thickness desired in the completed article, or, if desired, it may be of slightly greater wall thickness so as to permit a slight machining operation upon the irregular exterior contour before the next step in the method.

This partially completed product, either exactly as forged in the upsetting operation, or after the slight machining operation as the case may be, is then placed in the die block 19 as shown in Fig. 2, for the next step of the operation. This die block has a die cavity 20 having the straight side walls 21 of proper diameter to produce the desired outside contour of the finished piston skirt, or other article to be produced.

This cavity is shouldered at its lower end, as indicated at 22, and terminates in the reduced lower portion 23 having the flat bottom wall 24. The partially completed product 10 is placed within the cavity 20 as shown in Fig. 2, the lower end thereof resting upon the shoulder 22 of the cavity and the upper end thereof being substantially flush with the top of the die block 19.

An expansible mandrel is then positioned within the interior of the partially completed tubular product, said mandrel comprising a plurality of similar segments 25, preferably six of these segments being provided as best shown in Fig. 4 of the drawings. Each of these segments has the irregular outer contour 26 which is the desired inner contour required for the finished piston skirt or other article and which is just the reverse of the outer contour of the partially completed tubular product 10.

The lower ends of the segments 25 may be reduced in diameter as shown at 27 and provided with the annular groove 28 within which is located an annular coil spring 29 for urging the segments toward each other as indicated in Figs. 2 and 4, and these lower ends of the segments rest upon the flat bottom wall 24 of the die cavity.

The upper end of each segment is provided with the outwardly disposed flange portion 30 having an annular groove 31 therein to receive the endless coil spring 32 by means of which the upper portions of the segments are also normally urged toward each other.

A pair of bars 33 may be rigidly attached to two diametrically opposed segments as by the screws 34 to serve as handles for handling and manipulating the expansible mandrel. The inner surfaces of the mandrel segments 25 are transversely curved and downwardly and inwardly inclined as indicated at 35, forming a substantially inverted, conical opening within the mandrel when it is in the closed position as shown in Figs. 2 and 4.

For the purpose of expanding the mandrel, a conical plunger 36 is carried by the head 37 of the press, upon the table of which the die block 19 is mounted. With the partially completed tubular product 10 positioned in the die cavity and the mandrel positioned therein, as shown in Fig. 2, the press is operated to lower the plunger within the mandrel expanding the same as shown in Figs. 3 and 5.

As the mandrel segments 25 are forced outward the hot forging is deformed, the contour thereof being transferred to the interior, while the outside of the forging is pressed against the straight walls 21 of the die cavity.

As shown in Fig. 5, as the mandrel is expanded the segments 25 separate from each other along their longitudinal edges leaving a longitudinal edges leaving a longitudinal rib 38 upon the interior of the forging at each space between adjacent segments.

For this reason the plunger 35 is raised and the segments given a partial turn, by means of the handles 33, and the plunger 36 is again lowered expanding the mandrel and forcing the segments against the longitudinal ribs 38 in the forging so as to produce entirely symmetrical inner and outer contours thereto as shown in Fig. 6, producing the finished piston skirt forging as indicated generally at 39 in Fig. 7, this forging having the straight outer surface 40 and the irregular inner surface comprising the high points 41 and 42 near opposite ends terminating in the beveled portions 43 and 44 respectively and the low points 45 and 46 separated by the intermediate narrow high point 47.

With the exception of the necessary slight machining or grinding upon the exterior of the forging to fit into a cylinder, the piston skirt forging is thus completed and ready for use.

From the above it will be seen that the disadvantages and objections experienced under present practice are overcome, the expensive and difficult machining of the inside of the piston skirt being unnecessary and a substantially straight or longitudinal grain flow being produced, the grain following the irregular inner contour of the article.

I claim:

1. The method of making a hollow metal article with an irregular inside contour and a straight outside contour, which consists in forming a hollow metal blank having an irregular exterior contour substantially the same as the inside contour desired in the finished article and a straight inside contour, the walls of said blank having spaced outwardly thickened annular portions and intervening, relatively thin annular portions, then with the blank at forging temperature, press forging it internally by an outward radial pressure to press the relatively thin annular portions of the walls thereof outwardly flush with the outer diameter of the outwardly thickened annular portions so as to produce a straight outside contour and an irregular inside contour conforming to the outside contour of the blank.

2. The method of making a hollow metal article with an irregular inside contour and a straight outside contour, which consists in forming a hollow metal blank having an irregular exterior contour substantially the same as the inside contour desired in the finished article and a straight inside contour, the walls of said blank having spaced outwardly thickened annular portions and intervening, relatively thin annular portions, then with the blank at forging temperature, press forging it internally by an outward radial pressure to press the relatively thin annular portions of the walls thereof outwardly flush with the outer diameter of the outwardly thickened annular portions while confining the thickened portions against outward movement so as to produce a straight outside contour and an irregular inside contour conforming to the outside contour of the blank.

3. The method of making a hollow metal article with an irregular inside contour and a straight outside contour, which consists in forming a hollow metal blank having an irregular exterior contour substantially the same as the inside contour desired in the finished article and a straight inside contour, the walls of said blank having spaced outwardly thickened annular portions and intervening, relatively thin annular portions, then with the blank at forging temperature, press forging it internally by an outward radial pressure to press the relatively thin annular portions of the walls thereof outwardly to the diameter of the thickened portions so as to produce a straight outside contour and an irregular inside contour conforming to the outside contour of the blank.

4. The method of making a hollow, cylindrical metal article with an irregular inside contour and a straight cylindric outside contour, which consists in forming a hollow metal cylinder having an irregular exterior contour substantially the same as the inside contour desired in the finished article and a straight, cylindric inside contour, the walls of said cylinder having spaced outwardly thickened annular portions and intervening, relatively thin annular portions, then with the cylinder at forging temperature, press forging it internally by an outward radial pressure to press the relatively thin annular portions of the walls outwardly flush with the outer diameter of the outwardly thickened annular portions, so as to provide a straight, cylindric outside contour and an irregular inside contour conforming to the outside contour of the blank.

5. The method of making a hollow, cylindrical metal article with an irregular inside contour and a straight cylindric outside contour, which consists in forming a hollow metal cylinder having an irregular exterior contour substantially the same as the inside contour desired in the finished article and a straight, cylindric inside contour, the walls of said cylinder having spaced outwardly thickened annular portions and intervening, relatively thin annular portions, then with the cylinder at forging temperature, press forging it internally by an outward radial pressure to press the relatively thin annular portions of the walls outwardly to the diameter of the thickened annular portions while confining the thickened annular portions against outward movement so as to provide a straight, cylindric outside contour and an irregular inside contour conforming to the outside contour of the blank.

6. The method of making a hollow, cylindrical metal article with an irregular inside contour and a straight cylindric outside contour, which consists in forming a hollow metal cylinder having an irregular exterior contour substantially the same as the inside contour desired in the finished article and a straight, cylindric inside contour, the walls of said cylinder having spaced outwardly thickened annular portions and intervening, relatively thin annular portions, then with the cylinder at forging temperature, press forging it internally by an outward radial pressure to press the relatively thin annular portions of the walls outwardly to the diameter of the thickened annular portions so as to provide a straight, cylindric outside contour and an irregular inside contour conforming to the outside contour of the blank.

7. The method of making a piston skirt forging having a straight, cylindric outer contour and inwardly disposed, spaced annular ribs therein, which consists in forming a cylindric blank having a straight cylindric inside contour and outwardly disposed, spaced, annular ribs producing an exterior contour substantially the same as the inside contour desired in the finished piston skirt forging, then with the cylinder at forging temperature, press forging it internally by an outward radial pressure to displace the portions of the walls thereof intervening between said annular ribs outwardly so as, to provide a piston skirt forging having a straight, cylindric outside contour and inwardly disposed, spaced annular ribs therein conforming to the outwardly disposed spaced annular ribs of the blank.

CHARLES A. BRAUCHLER.

REFERENCES CITED

The following references are of record in the file of this patent:

UNITED STATES PATENTS

| Number | Name | Date |
|---|---|---|
| 1,625,131 | Miller | Apr. 19, 1927 |
| 1,823,158 | Mogford et al. | Sept. 15, 1931 |
| 1,929,802 | Brauchler | Oct. 10, 1933 |
| 1,945,092 | Storer | Jan. 30, 1934 |
| 2,040,957 | Sanders | May 19, 1936 |
| 2,340,784 | Westin | Feb. 1, 1944 |
| 2,452,974 | Westin | Nov. 2, 1948 |

FOREIGN PATENTS

| Number | Country | Date |
|---|---|---|
| 371,226 | Great Britain | Apr. 21, 1932 |
| 396,928 | France | Feb. 8, 1908 |